United States Patent
Ide

(10) Patent No.: US 7,881,865 B2
(45) Date of Patent: Feb. 1, 2011

(54) COLLISION DETERMINATION SYSTEM FOR VEHICLE

(75) Inventor: Seiya Ide, Okazaki (JP)

(73) Assignee: Denso Corporation, Kariya (JP)

( * ) Notice: Subject to any disclaimer, the term of this patent is extended or adjusted under 35 U.S.C. 154(b) by 1058 days.

(21) Appl. No.: 11/585,312

(22) Filed: Oct. 23, 2006

(65) Prior Publication Data

US 2007/0106474 A1 May 10, 2007

(30) Foreign Application Priority Data

Nov. 4, 2005 (JP) ............................ 2005-320779

(51) Int. Cl.
*G08G 1/16* (2006.01)

(52) U.S. Cl. ........................ 701/301; 701/70; 701/96; 340/903; 348/148

(58) Field of Classification Search ......... 701/300–301, 701/45, 96, 70; 340/436, 438, 903, 935, 340/936; 307/116, 119, 120; 348/148; 180/271
See application file for complete search history.

(56) References Cited

U.S. PATENT DOCUMENTS

| | | | |
|---|---|---|---|
| 5,748,075 A | 5/1998 | Dirmeyer et al. | |
| 6,226,389 B1 * | 5/2001 | Lemelson et al. | 382/104 |
| 6,271,747 B1 | 8/2001 | Fendt et al. | |
| 6,315,074 B1 | 11/2001 | Achhammer et al. | |
| 6,364,433 B1 * | 4/2002 | Stemer | 303/138 |
| 6,553,130 B1 * | 4/2003 | Lemelson et al. | 382/104 |
| 6,600,415 B1 * | 7/2003 | Li | 340/467 |
| 6,940,448 B2 * | 9/2005 | Knoop et al. | 342/70 |
| 6,970,787 B2 * | 11/2005 | Matsumoto et al. | 701/301 |
| 7,107,137 B2 * | 9/2006 | Tange et al. | 701/70 |
| 7,236,870 B2 * | 6/2007 | Tange et al. | 701/70 |
| 7,236,884 B2 * | 6/2007 | Matsumoto et al. | 701/300 |
| 7,424,364 B2 * | 9/2008 | Gern et al. | 701/301 |
| 7,433,769 B2 * | 10/2008 | Tange et al. | 701/41 |
| 7,509,211 B2 * | 3/2009 | Niwa et al. | 701/205 |
| 7,693,661 B2 * | 4/2010 | Iwasaka | 701/301 |
| 7,778,759 B2 * | 8/2010 | Tange et al. | 701/96 |
| 2001/0025735 A1 * | 10/2001 | Midorikawa et al. | 180/268 |

(Continued)

FOREIGN PATENT DOCUMENTS

CN 98/00182 * 3/2000

(Continued)

OTHER PUBLICATIONS

Jurgen, "Smart Cars and Highways Go Global," IEEE Spectrum, pp. 26-36 (May 1991).*

(Continued)

*Primary Examiner*—Cuong H. Nguyen
(74) *Attorney, Agent, or Firm*—Harness, Dickey & Pierce, PLC

(57) ABSTRACT

A collision determination system for a vehicle is disclosed. The system includes a vehicle behavior recognition unit that recognizes specific vehicle behavior indicative of a probable vehicle collision. The system also includes a collision detection sensor that detects a predetermined state change resulting from a vehicle collision. Furthermore, the system includes a collision determination unit that determines whether the vehicle collision necessitates activation of a vehicle passenger protection device based on the specific vehicle behavior recognized by the vehicle behavior recognition unit and the detected predetermined state change.

8 Claims, 5 Drawing Sheets

U.S. PATENT DOCUMENTS

| | | | |
|---|---|---|---|
| 2002/0156581 A1* | 10/2002 | Matsuura | 701/301 |
| 2003/0090150 A1* | 5/2003 | Woo | 303/191 |
| 2003/0227217 A1* | 12/2003 | Yoshizawa et al. | 303/193 |
| 2003/0233182 A1 | 12/2003 | Andres et al. | |
| 2004/0019426 A1* | 1/2004 | Knoop et al. | 701/301 |
| 2004/0022416 A1* | 2/2004 | Lemelson et al. | 382/104 |
| 2004/0036261 A1 | 2/2004 | Breed | |
| 2004/0098197 A1* | 5/2004 | Matsumoto et al. | 701/301 |
| 2004/0104570 A1* | 6/2004 | Midorikawa et al. | 280/807 |
| 2004/0107035 A1* | 6/2004 | Tange et al. | 701/70 |
| 2004/0195030 A1* | 10/2004 | Eberle et al. | 180/271 |
| 2004/0230375 A1* | 11/2004 | Matsumoto et al. | 701/301 |
| 2004/0254729 A1* | 12/2004 | Browne et al. | 701/301 |
| 2005/0012602 A1* | 1/2005 | Knoop et al. | 340/435 |
| 2005/0080530 A1* | 4/2005 | Arduc et al. | 701/37 |
| 2005/0187685 A1 | 8/2005 | Kondo et al. | |
| 2006/0113778 A1 | 6/2006 | Seikai | |
| 2007/0035182 A1* | 2/2007 | Wellhoefer et al. | 307/120 |

FOREIGN PATENT DOCUMENTS

| | | | |
|---|---|---|---|
| CN | 1822969 A | * | 8/2006 |
| DE | 2001-10121386.7 | * | 5/2001 |
| DE | 102 35 414 | * | 8/2002 |
| DE | 2002-10244205.3 | * | 9/2002 |
| DE | 103 37 620.8 | * | 8/2003 |
| DE | 10 2004 027 030 | * | 6/2004 |
| DE | 10 2005 018 697 | * | 4/2005 |
| DE | 103 60 769 | | 7/2005 |
| DE | 10 2004 012 916 | | 10/2005 |
| GB | 2 405 250 | | 2/2005 |
| JP | 5-56679 | | 7/1993 |
| JP | 7-237521 | | 9/1995 |
| JP | 11-099892 | | 4/1999 |
| JP | 2002-019555 | | 1/2002 |
| JP | 2002-104131 | | 4/2002 |
| JP | 2002-336634 | * | 11/2002 |
| JP | 2002-346378 | * | 11/2002 |
| JP | 2003-132899 | * | 5/2003 |
| JP | 2004-148864 | | 5/2004 |
| JP | 2004-352153 | | 12/2004 |
| JP | 2007523785 W | * | 8/2007 |
| WO | WO 2005/007465 | | 1/2005 |
| WO | WO 2005007465 A1 | * | 1/2005 |
| WO | WO 2005/021337 | | 3/2005 |

OTHER PUBLICATIONS

Application of Reactive Multi-agent System to Vehicle Collision Avoidance; Sibo Yang; Gechter, F.; Koukam, A.; Tools with Artificial Intelligence, 2008. ICTAI '08. 20th IEEE International Conference on; vol. 1; Digital Object Identifier: 10.1109/ICTAI.2008.134; Publication Year: 2008 , pp. 197-204.*

Collision Avoidance for Vehicle-Following Systems; Gehrig, S.K.; Stein, F.J.; Intelligent Transportation Systems, IEEE Transactions on; vol. 8 , Issue: 2; Digital Object Identifier: 10.1109/TITS.2006.888594; Publication Year: 2007 , pp. 233-244.*

Development of a collaborative vehicle collision avoidance system; Konstantinidis, E.I.; Patoulidis, G.I.; Vandikas, I.N.; Parisses, C.; Asimopoulos, N.; Intelligent Vehicles Symposium (IV), 2010 IEEE; Digital Object Identifier: 10.1109/IVS.2010.5548022 Publication Year: 2010 , pp. 1066-1071.*

Architecture and Algorithm for a Laboratory Vehicle Collision Avoidance System; Robinson, C.L.; Schutz, H.J.; Baliga, G.; Kumar, P.R.; Intelligent Control, 2007. ISIC 2007. IEEE 22nd International Symposium on; Digital Object Identifier: 10.1109/ISIC.2007.4450855; Publication Year: 2007 , pp. 23-28.*

A design of vehicle collision avoidance system based on DSP; Shan Zhu; Honghui Zhu; Mi Zhou; Mechatronics and Automation, 2009. ICMA 2009. International Conference on; Digital Object Identifier: 10.1109/ICMA.2009.5246583; Publication Year: 2009 , pp. 530-534.*

A cooperative radar system for collision avoidance and communications between vehicles; Tatkeu, C.; Deloof, P.; Elhillali, Y.; Rivenq, A.; Rouvaen, J.M.; Intelligent Transportation Systems Conference, 2006. ITSC '06. IEEE; Digital Object Identifier: 10.1109/ITSC.2006.1707354; Publication Year: 2006 , pp. 1012-1016.*

Fuzzy logic based integrated control of Anti-lock Brake System and Collision Avoidance System using CAN for electric vehicles Sudeendra Kumar, K.; Verghese, L.; Mahapatra, K.K.; Industrial Technology, 2009. ICIT 2009. IEEE International Conference on ; Digital Object Identifier: 10.1109/ICIT.2009.4939720; Publication Year: 2009 , pp. 1-5.*

Integrated headway adaptation with collision avoidance system for intelligent vehicles; Hsin-Han Chiang; Bing-Fei Wu; Tsu-Tian Lee; Jau-Woei Perng; Systems, Man and Cybernetics, 2007. ISIC. IEEE International Conference on; Digital Object Identifier: 10.1109/ICSMC.2007.4414156 ; Publication Year: 2007 , pp. 3276-3281.*

Search Report issued Apr. 24, 2007 in European Application No. 06 02 2430.

Office Action dated Jun. 5, 2009 in European Application No. 06 022 430.

Search Report issued Feb. 23, 2007 in European Application No. 06 02 2430.

Office Action dated Dec. 17, 2009 in Japanese Application No. 2005-320779.

Office Action dated Dec. 29, 2009 in corresponding EP Application No. 09013867.8.

* cited by examiner

COLLISION DETERMINATION SYSTEM FOR VEHICLE

CROSS REFERENCE TO RELATED APPLICATION(S)

The following is based on and claims priority to Japanese Patent Application No. 2005-320779, filed Nov. 4, 2005 and is hereby incorporated by reference in its entirety.

FIELD

The present invention relates to a vehicle collision determination device that determines whether a collision has occurred.

BACKGROUND

Various vehicle collision determining systems have been proposed that can automatically detect the occurrence of a collision. These systems can function in combination with a passenger protection device, such as an inflatable airbag, such that the operation of the protection device depends on the occurrence of a collision. For instance, when the vehicle collision determining device detects the occurrence of a collision, a signal is transmitted to thereby cause inflation of an airbag.

In such a system, various sensors are used as collision detection sensors. For example, an acceleration sensor can be installed near a center pillar on a vehicle side to detect an acceleration change indicative of a side impact collision. In another example, a pressure sensor is installed in a vehicle door to detect pressure change therein and thereby detect a collision. U.S. Pat. No. 5,748,075 (Japanese Patent No. 2,654,428) discloses such a system.

FIG. 11 is a schematic illustration of a prior art vehicle passenger protection system with a collision determination system. As shown, the passenger protection system 101 includes a control circuit 110, a main sensor 160, a safing sensor 162, a drive circuit 180, and a vehicle passenger protection device 190. The control circuit 110 includes a determination circuit 120, an input/output (I/O) circuit 130, ROM 140, and RAM 150. The main sensor 160 is a collision detection sensor (e.g. acceleration sensor or pressure sensor) that detects the occurrence of a collision. The safing sensor 162 is a collision detection sensor that detects impact in the same direction as the main sensor 160 to thereby provide redundancy for added reliability of the determination circuit 120.

However, these prior art systems suffer from certain disadvantages. For instance, vehicles can include a relatively high number of collision sensors. Furthermore, more advanced microcomputers are used to handle the increased computing load necessary for communication with the increased number of sensors. This leads to increased costs.

Moreover, prior art systems typically detect the occurrence of a collision without regard to the behavior of the vehicle and instead rely solely on the output of the collision sensors. As such, a collision may be inaccurately detected in certain situations, such as when the vehicle door is opened and impacts a stationary obstacle.

SUMMARY

A collision determination system for a vehicle is disclosed. The system includes a vehicle behavior recognition unit that recognizes specific vehicle behavior indicative of a probable vehicle collision. The system also includes a collision detection sensor that detects a predetermined state change resulting from a vehicle collision. Furthermore, the system includes a collision determination unit that determines whether the vehicle collision necessitates activation of a vehicle passenger protection device based on the specific vehicle behavior recognized by the vehicle behavior recognition unit and the detected predetermined state change.

A collision determination system for a vehicle is also disclosed that includes a collision detection sensor that detects a predetermined state change resulting from a vehicle collision. The system further includes a collision determination unit that determines whether the vehicle collision necessitates activation of a vehicle passenger protection device based on input information regarding the environment of the vehicle indicative of a probable vehicle collision and further based on the detected predetermined state change.

BRIEF DESCIPTION OF THE DRAWINGS

DETAILED DESCRIPTION

Figure 1:
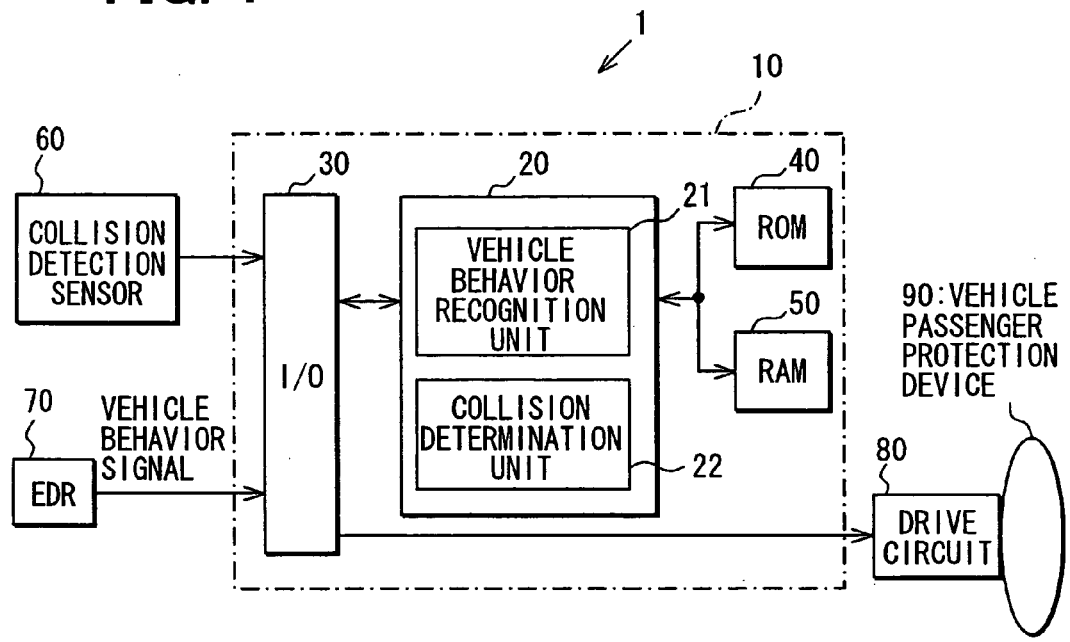
FIG. 1 is a schematic view of one embodiment of a collision determination system and a passenger protection device.

First, description will be given to the overall configuration of one embodiment of a collision determination system 1 shown in FIG. 1 and FIG. 2. As illustrated in FIG. 1, the collision determination system 1 includes a control circuit 10, collision detection sensors 60, an event data recorder 70 (EDR), drive circuits 80, and vehicle passenger protection devices 90.

Figure 2:
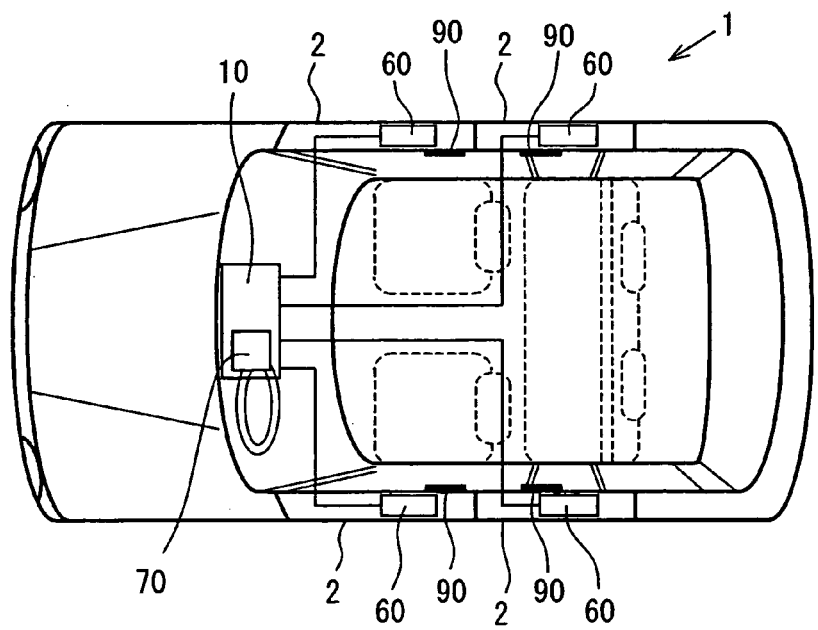
FIG. 2 is a schematic view of a vehicle with the collision determination system of FIG. 1.

As illustrated in FIG. 2, the vehicle passenger protection device 90 is provided at each door 2. In the embodiment shown, the protection device 90 is at least one side airbag for protecting an occupant against side impact. Once activated, the side airbag is inflated by a corresponding drive circuit 80. Those having ordinary skill in is the art will appreciate that the vehicle passenger protection device 90 is not limited to side airbags, and may be an airbag for front-end impacts, a seat belt pretensioner, a curtain airbag, or the like.

Figure 3A:
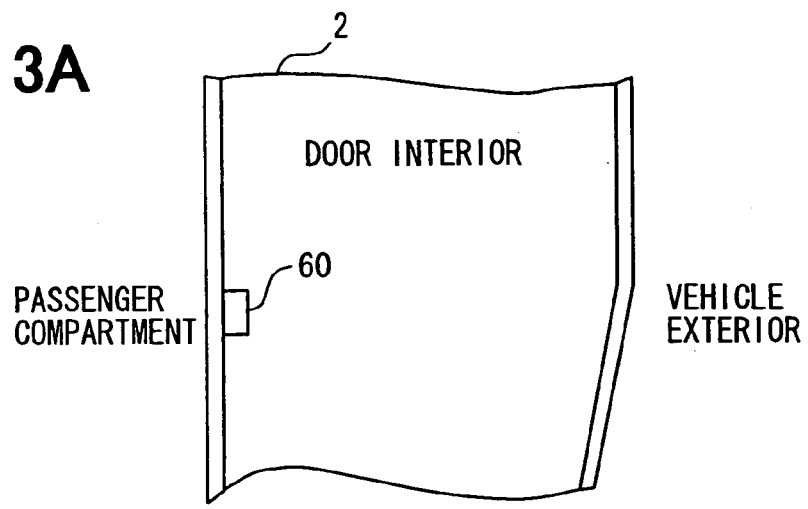
FIGS. 3A and 3B are schematic sectional views of a vehicle door both before and during a vehicle collision.
Figure 3B:
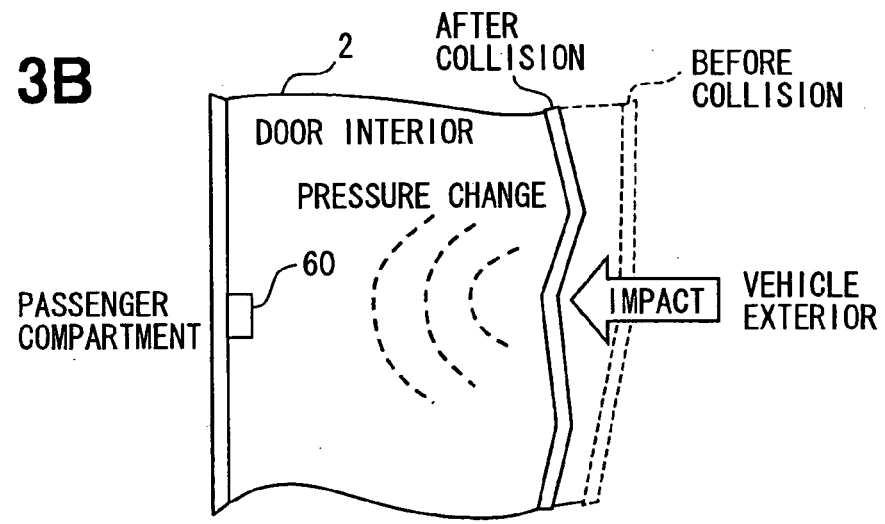

In the embodiment shown in FIGS. 3A and 3B, the collision detection sensor 60 is a pressure sensor that is placed within a hollow space in the vehicle. Specifically, the sensor 60 is provided within a hollow space in the vehicle door 2 for detecting the pressure therein. As shown in FIG. 3B, when the door 2 is impacted during a vehicle collision, the volumetric capacity of the door 2 reduces according to the magnitude of impact, and the pressure of the internal air is increased. The pressure change in the door 2 is detected by the corresponding collision detection sensor 60. Accordingly, the vehicle collision is detected.

The event data recorder 70 (EDR) is a device that records varied information related to vehicle behavior. The event data recorder 70 records signals that are correlated with one or more types of vehicle behavior. For instance, the event data recorder 70 receives vehicle behavior signals inputted from a vehicle speed sensor, an accelerator opening sensor, a steering angle sensor, a braking sensor, and a yaw rate sensor for detecting skid. Further, the event data recorder 70 outputs vehicle behavior signals such as vehicle speed signals, accelerator opening signals, steering angle signals, braking signals, and skid signals.

The control circuit 10 is an electronic circuit based on a microcomputer, and includes a determination circuit 20, an input/output circuit 30 (I/O), ROM 40, and RAM 50. The control circuit 10 determines whether a vehicle collision necessitates activation of the vehicle passenger protection device 90 based on the output of the collision detection sensors 60 and the event data recorder 70, and outputs ignition signals if activation of the protection device 90 is necessary.

Figure 4:
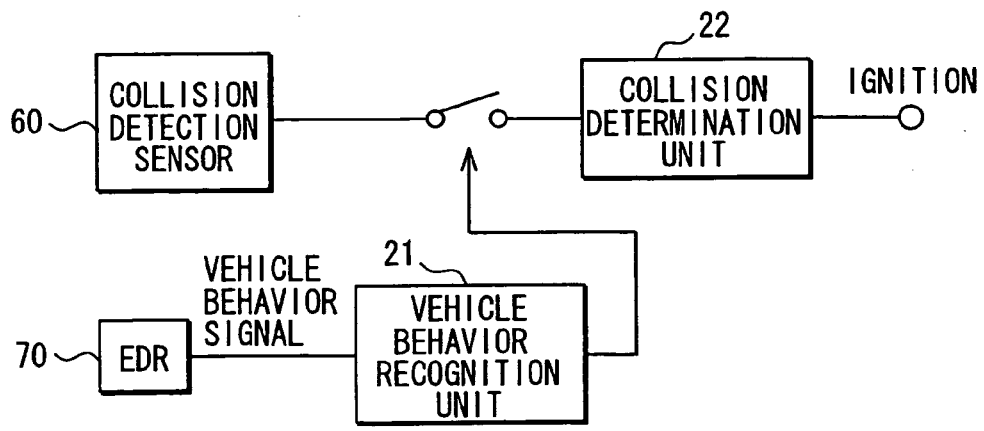
FIG. 4 is a schematic view of a determination circuit of the collision determination system of FIG. 1.

The determination circuit 20 is specifically constructed of a CPU. It reads and executes a control program stored in the ROM 40 and thereby implements a vehicle behavior recognition unit 21 and a collision determination unit 22. The RAM 50 is used when the control program is executed. FIG. 4 is a block diagram illustrating the logical construction of the determination circuit 20.

The vehicle behavior recognition unit 21 is inputted with various vehicle behavior signals, such as vehicle speed signals, accelerator opening signals, steering angle signals, braking signals, and skid signals from the event data recorder 70. The vehicle behavior recognition unit 21 recognizes vehicle behavior based on these vehicle behavior signals. The collision detection sensor 60 is normally deactivated. For instance, in the example illustrated in FIG. 4, the switch between the collision detection sensor 60 and the collision determination unit 22 is open. Therefore, when the switch is open, the result of pressure detection from the collision detection sensor 60 is not received by the collision determination unit 22.

When the vehicle behavior recognition unit 21 recognizes specific vehicle behavior that makes collision probable (e.g., vehicle speed of at least a predetermined value, high braking levels, extreme steering angles, emergency situations such as skidding, or a combination thereof), the collision detection sensor 60 is activated for detecting pressure change in the door 2. For instance, in the embodiment shown, when the vehicle behavior recognition unit 21 recognizes a specific vehicle behavior indicative of a probable vehicle collision, the switch between the collision detection sensor 60 and the collision determination unit 22 is closed. Then, the result of pressure detection is inputted from the collision detection sensor 60 to the collision determination unit 22. Based on the result of pressure detection by the collision detection sensor 60, the collision determination unit 22 determines whether the vehicle passenger protection device 90 should be activated. If the vehicle passenger protection device 90 is to be activated due to detection of a vehicle collision, an ignition signal for activating the vehicle passenger protection device 90 is inputted to the drive circuit 80 through the input/output circuit 30.

Thus, based on input of a vehicle behavior signal indicating vehicle behavior from the event data recorder 70, the vehicle behavior recognition unit 21 recognizes specific vehicle behavior during which a collision is more likely. If collision is more likely, the collision detection sensor 60 detects change in the pressure in the door 2 resulting from a vehicle collision. The collision determination unit 22 determines whether the passenger protection device 90 should be activated based on the specific vehicle behavior recognized by the vehicle behavior recognition unit 21 and the pressure change in the door 2 detected by the collision detection sensor 60.

As such, reliable and appropriate collision determination can be made in accordance with vehicle behavior with a relatively simple system. For instance, the number of sensors can be reduced for collision detection and the processing load on a microcomputer of the determination circuit 20 can be reduced. Thus, the cost of the vehicle passenger protection system 1 can be reduced.

When the specific vehicle behavior is recognized by the vehicle behavior recognition unit 21, the collision determination unit 22 determines whether the collision is one that necessitates activation of the vehicle passenger protection device 90. Therefore, the collision detection and activation of the passenger protection device 90 can be more accurate. When the vehicle behavior is detected that indicates a collision is improbable, the collision determination unit 22 does not determine whether a collision occurs. Therefore, processing load on the microcomputer of the determination circuit 20 can be reduced.

The collision detection sensor 60 is normally kept deactivated. When collision is more probable based on the specific vehicle behavior recognized by the vehicle behavior recognition unit 21, the collision detection sensor 60 is activated and monitors for pressure change in the door 2. Therefore, the power consumption of the collision detection sensor 60 can be reduced.

The vehicle behavior recognition unit 21 recognizes vehicle behavior indicative of probable collision based on the following. Probable collision is recognized based on input of a vehicle behavior signal from the event data recorder 70 that records various information related to vehicle behavior. The event data recorder 70 can utilize vehicular collision statistics that correlate specific vehicle behavior with vehicular collision. The event data recorder 70 can be incorporated within the electronic control unit (ECU).

Therefore, vehicle collision detection and activation of the vehicle passenger protection device 90 can be more accurate. For instance, in the embodiment shown, vehicle side collisions are detected. When the car is stopped or is traveling at low speeds, there is less possibility that a side collision will occur and/or there is less possibility that a collision will necessitate activation of the passenger protection device 90. Specifically, if the door is opened and hits a stationary object, the passenger protection device 90 will not be activated. It will be appreciated that the collision detection sensor 60 could be provided for a localized area on the vehicle (e.g., an area with relatively low rigidity) for detecting collision at that localized area. It will also be appreciated that collision determination can be performed with a relatively small number of sensors.

Figure 5:
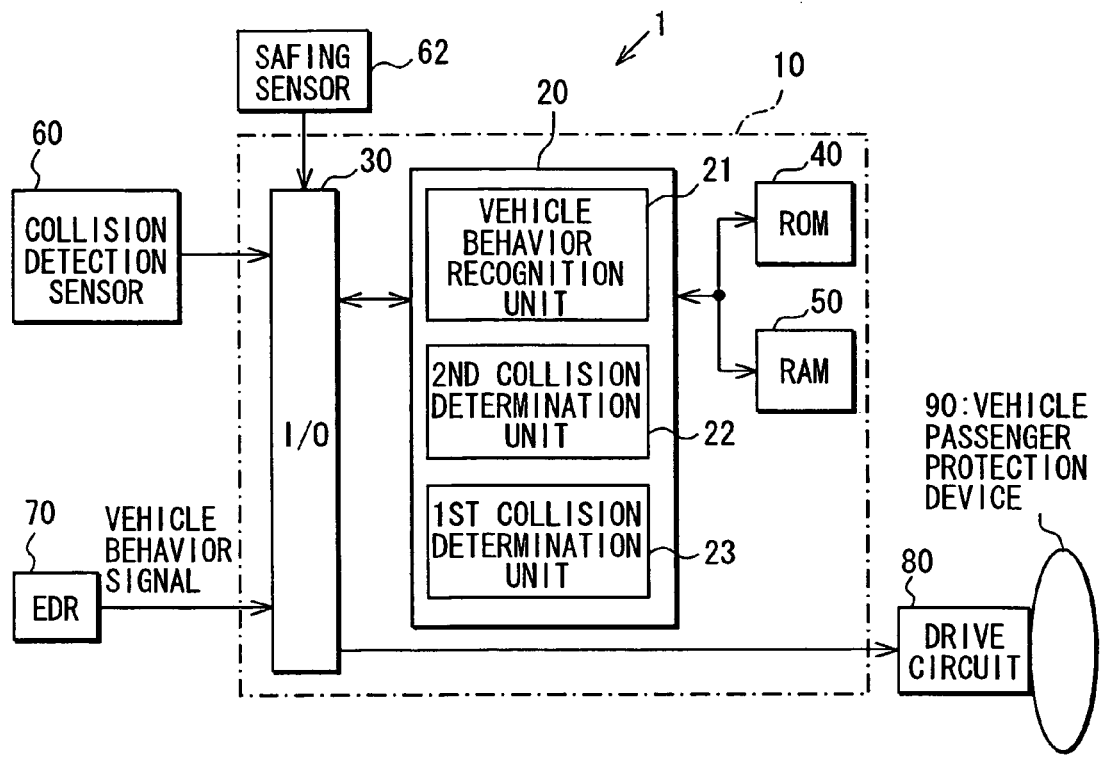
FIG. 5 is a schematic view of another embodiment of the collision determination system.
Figure 6:
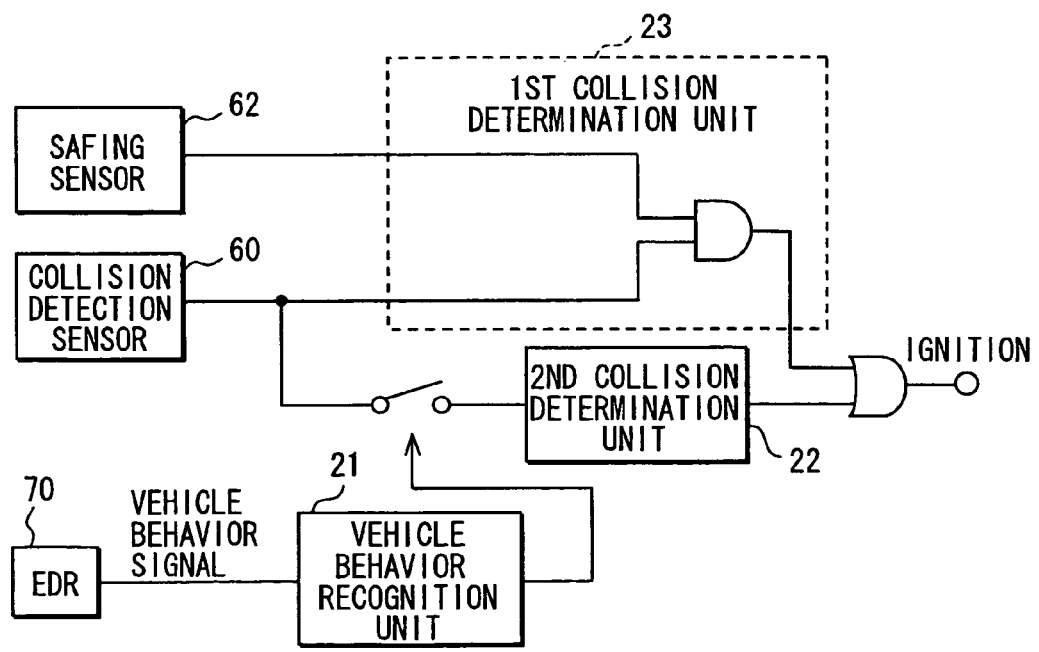
FIG. 6 is a schematic view of a determination circuit of the collision determination system of FIG. 5.

Referring now to FIGS. 5 and 6, another embodiment of the vehicle collision determination system is illustrated. Similar components as those of the embodiment of FIGS. 1-4 will be identified by similar reference numerals.

In the embodiment of FIGS. 5 and 6, the system 1' includes the collision detection sensor 60 as a main sensor, and a safing sensor 62 that provides redundancy for collision detection. The safing sensor 62 is, for example, an acceleration sensor. The determination circuit 20 is constructed of the vehicle behavior recognition unit 21, a first collision determination unit 23, and a second collision determination unit 22.

As illustrated in FIG. 6, the first collision determination unit 23 outputs the logical product (AND) of the output of the collision detection sensor 60 and the output of the safing sensor 62 as the result of determination. The second collision determination unit 22 is similar to the collision determination unit 22 of the embodiment of FIGS. 1-4.

The collision detection sensor 60 is normally deactivated. In the embodiment shown, for example, the switch between the collision detection sensor 60 and the second collision determination unit 22 is normally open. Therefore, the result of pressure detection is not inputted from the collision detection sensor 60 to the second collision determination unit 22. When specific vehicle behavior is recognized by the vehicle behavior recognition unit 21 indicating probable vehicle collision, the collision detection sensor 60 is activated. In the embodiment shown, the switch between the collision detection sensor 60 and the second collision determination unit 22 is closed. As a result, the result of pressure detection is inputted from the collision detection sensor 60 to the second collision determination unit 22. The collision determination unit 22 determines whether the impact necessitates activation of the vehicle passenger protection device 90. This determination is made based on the detection result of the collision detection sensor 60 (i.e., the detected pressure change). The collision determination unit outputs the result of determination. Then, an ignition signal is outputted based on the logical sum (OR) of the output of the first collision determination unit 23 and the output of the second collision determination unit 22. A1

In this embodiment, the determination circuit 20 is used to determine whether the impact necessitates activation of the passenger protection device 90. This determination is made based on the pressure change in the door 2 detected by the collision detection sensor 60 and the acceleration detected by the safing sensor 62 and by recognizing the vehicle behavior indicative of a vehicle impact. Because of the collision sensing redundancy provided by the safing sensor 62, more reliable and appropriate collision determination can be made in accordance with vehicle behavior.

Figure 7:
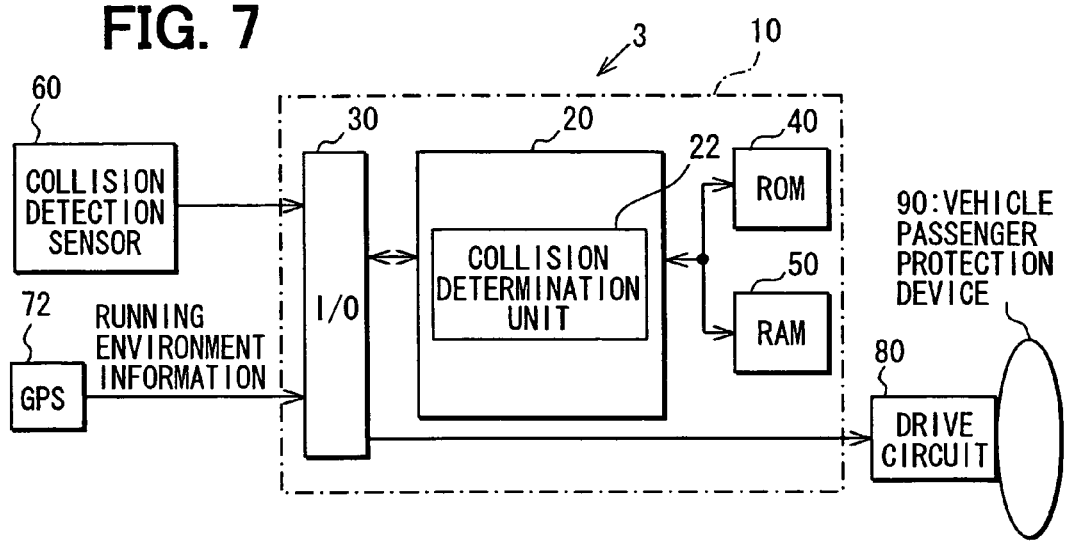
FIG. 7 is a schematic view of another embodiment of the collision determination system.
Figure 8:
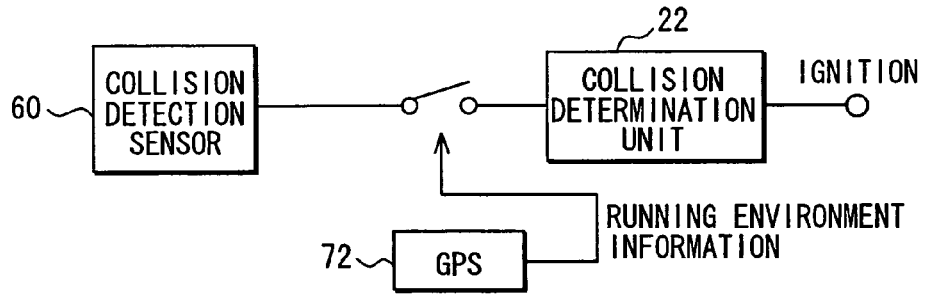
FIG. 8 is a schematic view of a determination circuit of the collision determination system of FIG. 7.

Referring now to FIGS. 7 and 8, another embodiment of the vehicle collision determination system is illustrated. In this embodiment, the collision determination unit 22 determines whether the collision necessitates activation of the passenger protection device 90. This determination is made based on input of information from the GPS device 72. More specifically, the GPS device 72 detects the environment of the vehicle, and when the environment is indicative of a probable collision, the passenger protection device 90 can be activated. At the same time, the determination is based on the pressure change in the door 2 detected by the collision detection sensor 60.

In one embodiment, the GPS device 72 is a publicly known GPS (Global Positioning System) device. When the relevant vehicle is running on a congested road, in an area with many trees nearby, or in other like cases, it outputs environment information that indicates the vehicle is more likely to be involved in a collision as compared to other environments.

The collision detection sensor 60 is normally deactivated. In the embodiment shown in FIG. 8, the switch between the collision detection sensor 60 and the collision determination unit 22 is open to thereby deactivate the collision detection sensor 60. Therefore, the result of pressure detection is not inputted from the collision detection sensor 60 to the collision determination unit 22. When the GPS 72 detects vehicle environment indicative of a probable collision, the collision detection sensor 60 is activated and detects pressure changes in the door 2. (In the embodiment shown, the switch between the collision detection sensor 60 and the collision determination unit 22 is closed.) Then, the result of pressure detection is inputted from the collision detection sensor 60 to the collision determination unit 22. Based on the result of pressure detection by the collision detection sensor 60, the collision determination unit 22 determines whether the vehicle passenger protection device 90 is to be activated. If the vehicle passenger protection device 90 is to be activated, the collision determination unit 22 outputs an ignition signal for activating the vehicle passenger protection device 90 to the drive circuit 80 through the input/output circuit 30.

In this embodiment, the collision detection sensor 60 detects pressure change in the door 2 resulting from impact on the relevant vehicle. The collision determination unit 22 determines whether the impact necessitates activation of the vehicle passenger protection device 90. This determination is made based on input from the GPS device 72 indicating that the vehicle is in an environment in which collision is more probable and the result of pressure change in the door 2 detected by the collision detection sensor 60.

Using environment information detected by the GPS device 72, reliable and appropriate collision determination can be made with relatively few sensors. This reduces costs and reduces computing load on the system.

Figure 9:
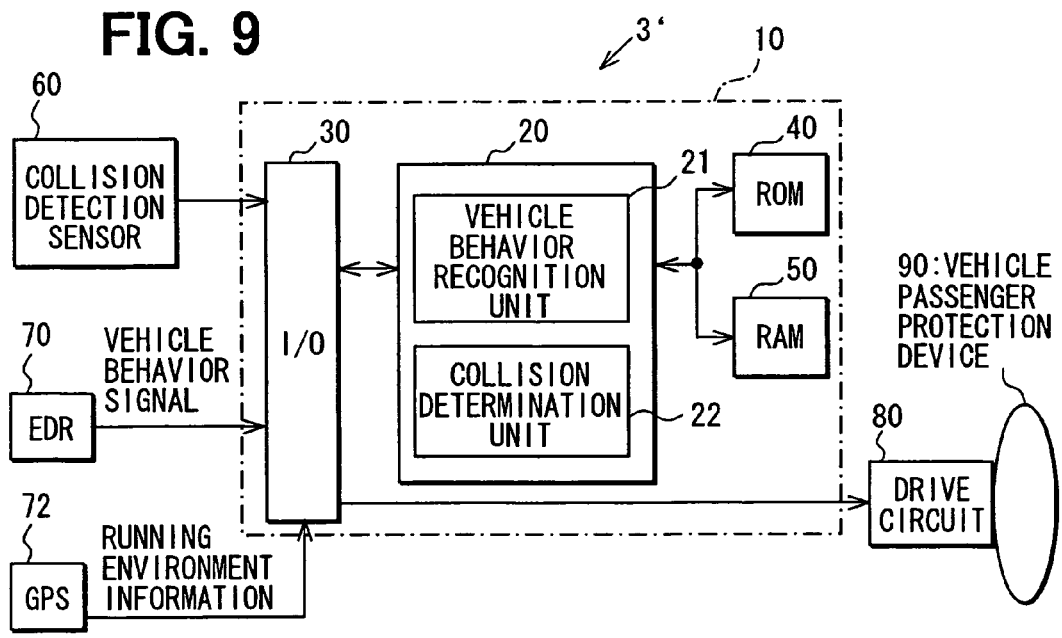
FIG. 9 is a schematic view of another embodiment of a collision determination system.
Figure 10:
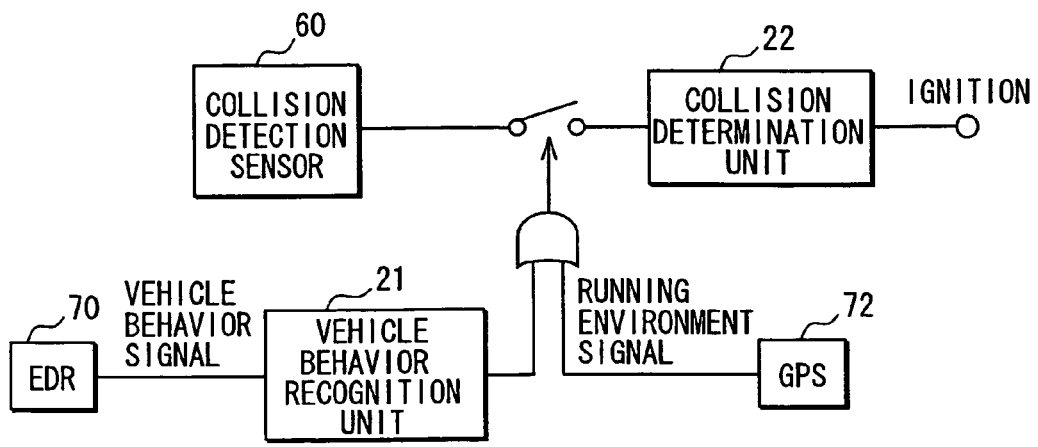
FIG. 10 is a schematic view of a determination circuit of the collision determination system of FIG. 9.
Figure 11:
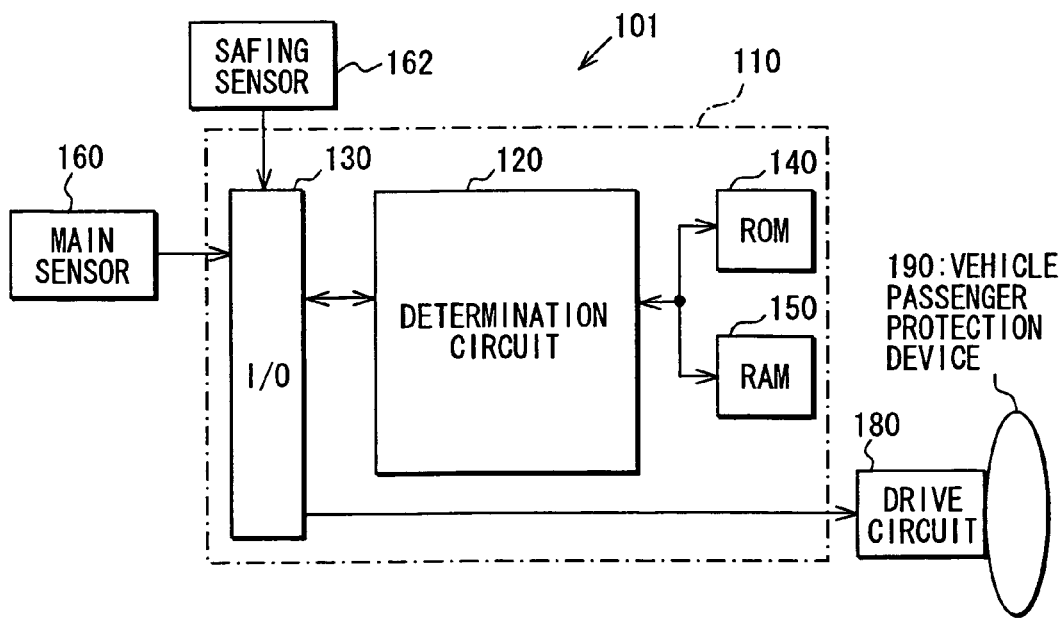
FIG. 11 is a schematic view of a collision determination system of the prior art.

Referring now to FIGS. 9 and 10, another embodiment of the collision determination system 3' is illustrated. In the collision determination system 3' shown, a vehicle behavior signal indicating vehicle behavior is inputted from the event data recorder 70, and vehicle behavior indicating a probable collision is recognized by the vehicle behavior recognition unit 21. In addition, information indicating that the vehicle is an environment of a probable collision is inputted from the GPS device 72. Then, the collision determination unit 22 determines whether an impact necessitates activation of the vehicle passenger protection device 90. This determination is based on the result of recognition of the vehicle behavior by the vehicle behavior recognition unit 21, input of information indicating a vehicle environment of probable collision from the GPS device 72, and the pressure change in the door 2 detected by the collision detection sensor 60.

The collision detection sensor 60 is normally deactivated. In the embodiment shown, the switch between the collision detection sensor 60 and the second collision determination unit 22 remains open to deactivate the collision detection sensor 60. Therefore, the result of pressure detection is not inputted from the collision detection sensor 60 to the collision determination unit 22. When the vehicle behavior indicating probable collision is recognized by the vehicle behavior recognition unit 21 or the vehicle environment indicates probable collision, the collision detection sensor 60 is activated. (In the embodiment shown, the switch between the collision detection sensor 60 and the collision determination unit 22 is closed.) Then, the result of pressure detection is inputted from the collision detection sensor 60 to the collision determination unit 22. Based on the result of pressure detection by the collision detection sensor 60, the collision determination unit 22 determines whether the collision necessitates activation of the vehicle passenger protection device 90. When the collision determination unit 22 determines that an impact necessitates activation of the vehicle passenger protection device 90, it outputs an ignition signal for activating the vehicle passenger protection device 90 to the drive circuit 80 through the input/output circuit 30.

In this embodiment, the determination circuit 20 determines whether the vehicle collision necessitates activation of the vehicle passenger protection device 90. This determination is made based on the pressure change detected in the door 2 by the collision detection sensor 60 and the environment of the vehicle detected by the GPS device 72 or the result of recognition of specific vehicle behavior by the vehicle behavior recognition unit 21 indicating a probable vehicle collision. Therefore, more reliable and responsive and appropriate collision determination can be made in correspondence with vehicle behavior and a running environment. Also, in this embodiment, it is possible to reduce the number of sensors and reduce processing load on the microcomputer that constructs the determination circuit 20 for reducing the cost of the entire collision determination system 3'.

It will be appreciated that the invention is not limited to the above-mentioned embodiments, and various modifications can be made without departing from the scope of the disclosure.

For example, in one embodiment, the collision detection sensor 60 Remains activated under normal conditions and detects pressure change in the door 2. When specific vehicle behavior is recognized by the vehicle behavior recognition unit 21 indicative of a vehicle collision, the collision determination unit 22 is activated and determines whether the vehicle passenger protection device 90 should be activated. This determination is based on the pressure change detected in the door 2 by the collision detection sensor 60. According to this embodiment, processing load on the microcomputer that constructs the determination circuit 20 can be reduced.

Further, a self-diagnosis unit can be provided. When the vehicle behavior recognition unit 21 recognizes vehicle behavior other than the specific vehicle behavior indicating a probable collision, the self-diagnosis unit diagnoses the state of the collision detection sensor 60 based on the output of the collision detection sensor 60. In another embodiment, the self-diagnosis is performed when input information regarding the environment of the vehicle fails to indicate a probable vehicle collision. According to this embodiment, the collision detection sensor 60 is self-diagnosed when collision is unlikely to occur. (Examples of such a situation include situations in which the vehicle is stationary, and situations in which the vehicle is running under normal conditions.) Thus, the reliability of the collision detection sensor 60 can be enhanced.

It will also be appreciated that the collision detection sensor 60 could be of any suitable type other than a pressure sensor and could be supported in any suitable location. The collision detection sensor 60 may be, for example, an acceleration sensor that is installed in the center pillar at a side face of the relevant vehicle and detects acceleration. As such, the acceleration sensor detects acceleration resulting from impact on a side face of the vehicle and the collision determination unit 22 determines whether the impact necessitates activation of the vehicle passenger protection device 90. Thus, the collision determination unit 22 determines whether the vehicle passenger protection device 90 is to be activated based on the specific vehicle behavior by the vehicle behavior recognition unit 21 and the acceleration detected by the acceleration sensor.

The collision detection sensor 60 may also be a load sensor that detects collision load on the vehicle. According to this modification, the load sensor detects a load corresponding to a collision and the determination unit 22 can determine whether the collision necessitates activation of the vehicle passenger protection device 90. More specifically, the determination unit 22 determines whether to activate the passenger protection device 90 based on recognition of specific vehicle behavior by the vehicle behavior recognition unit 21 and the load detected by the load sensor.

In several of the embodiments described above, the vehicle behavior signals outputted from the event data recorder 70 are inputted to the control circuit 10. In another embodiment, the signals are directly inputted from the respective sensors to the control circuit 10 as vehicle behavior signals. The directly inputted signals include vehicle speed signals outputted from the vehicle speed sensor, accelerator opening signals outputted from the accelerator opening sensor, steering angle signals outputted from the steering angle sensor, braking signals outputted from the braking sensor, and skid signals outputted from the yaw rate sensor for detecting skid. It will be appreciated that various signals indicating vehicle behavior can be utilized as a vehicle behavior signal. For example, the invention may be so constructed that signals indicating the state of operation of ABS (Antilock Brake System) are inputted as vehicle behavior signal to the control circuit 10.

Moreover, in the embodiments described above, environment information is input from the GPS device 72 to the control circuit 10. In another embodiment, the environment information is inputted from a publicly known vehicle-to-vehicle communication device (or in addition to environment information from the GPS device 72). The vehicle-to-vehicle communication device enables communication of information between the vehicle and another vehicle. For example, the environment information may be inputted from the vehicle-to-vehicle communication device when there is the possibility of a head-on collision at an intersection or on other like occasions. Thus, in this modification, high responsivity can be achieved.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A collision determination system for a vehicle comprising:
    a vehicle behavior recognition unit that recognizes specific vehicle behavior indicative of a probable vehicle collision;
    a collision detection sensor that detects a predetermined state change resulting from a vehicle collision;
    a safing sensor that detects another predetermined state change resulting from the vehicle collision; and
    a collision determination unit that determines whether the vehicle collision necessitates activation of a vehicle passenger protection device based on the specific vehicle behavior recognized by the vehicle behavior recognition unit, the detected predetermined state change of the collision detection sensor, and the detected predetermined state change of the safinq sensor; and
    wherein the vehicle behavior recognition unit recognizes the specific vehicle behavior based on an inputted vehicle behavior signal, and wherein the vehicle behavior signal is at least one of a vehicle speed signal, an accelerator opening signal, a steering angle signal, a braking signal, and skid signal.

2. The collision determination system according to claim 1 wherein the collision detection sensor is at least one of an acceleration sensor, a pressure sensor, and a load sensor.

3. The collision determination system according to claim 1 wherein when the specific vehicle behavior is recognized by the vehicle behavior recognition unit, the collision determining unit determines whether the vehicle collision necessitates activation of a vehicle passenger protection device based on the detected predetermined state change.

4. The collision determination system according to claim 3, wherein the collision detection sensor is normally deactivated and is activated when the specific vehicle behavior is recognized by the vehicle behavior recognition unit.

5. The collision determination system according to claim 3, wherein the collision detection sensor remains activated.

6. The collision determination system according to claim 5, wherein the collision determination unit comprise a self-diagnosing device that self-diagnoses the state of the collision detection sensor when vehicle behavior is other than the specific vehicle behavior recognized by the vehicle behavior recognition unit.

7. The collision determination system according to claim 1, wherein the collision determination unit determines whether the vehicle collision necessitates activation of a vehicle passenger protection device based further on environment information of the vehicle indicating that collision is probable.

8. The collision determination system according to claim 1, wherein the vehicle behavior recognition unit recognizes the specific vehicle behavior based on an inputted vehicle behavior signal, and wherein the vehicle behavior signal is inputted from an event data recorder.

* * * * *